United States Patent [19]

Fukami

[11] Patent Number: 4,604,540
[45] Date of Patent: Aug. 5, 1986

[54] CORELESS MOTOR, AND A METHOD FOR MANUFACTURING THE CORELESS MOTOR

[75] Inventor: Tadashi Fukami, Sagamihara, Japan

[73] Assignee: Oken Seiko Co., Ltd., Tokyo, Japan

[21] Appl. No.: 233,817

[22] Filed: Feb. 12, 1981

[30] Foreign Application Priority Data

Feb. 18, 1980 [JP] Japan .................................. 55-18818

[51] Int. Cl.⁴ ............................................ H02K 21/26
[52] U.S. Cl. .................................... 310/154; 310/266; 310/268
[58] Field of Search ................ 310/266, 268, 156, 154

[56] References Cited

U.S. PATENT DOCUMENTS 1,947,269  2/1934  Leibing ................................. 310/156
3,312,846  4/1967  Henry-Baudot ..................... 310/266
3,440,464  4/1969  Tolmie ............................ 310/268 X Primary Examiner—Donovan F. Duggan
Attorney, Agent, or Firm—Townsend & Townsend

[57] ABSTRACT

A rotor winding of air-core disc shape is formed by winding an insulation-coated conductor so as to enclose a yoke of disc shape with only minor gaps at the outside of the yoke. The conductor of this rotor winding extends in the radial direction through the vicinity of the center, and is continuously wound, the turns being successively shifted in the tangential direction. The rotor is composed of the rotor winding, a rotor shaft fixed on this center, and a commutator. A permanent magnet is provided in such a position as opposes the yoke through the plane of the rotor winding of air-core disc shape. This magnet has at least a pair of magnet poles distributed to the opposite position against the rotor shaft, and each magnet pole supplies reverse magnet flux to the opposing yoke. The yoke, the magnet, and a brush contacted the commutator are mounted on the motor case, and the rotor is supported to the motor case so as to be rotated freely.

8 Claims, 36 Drawing Figures

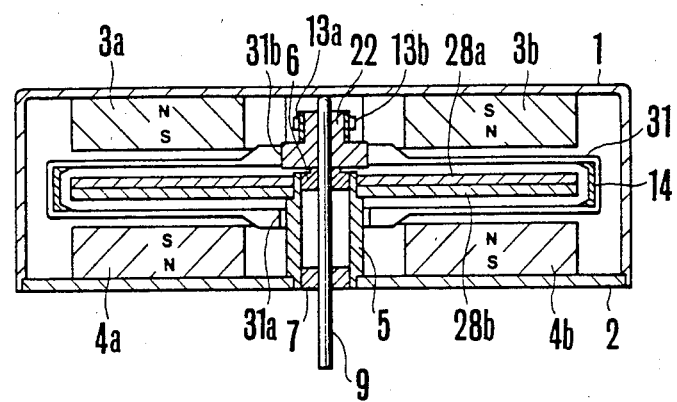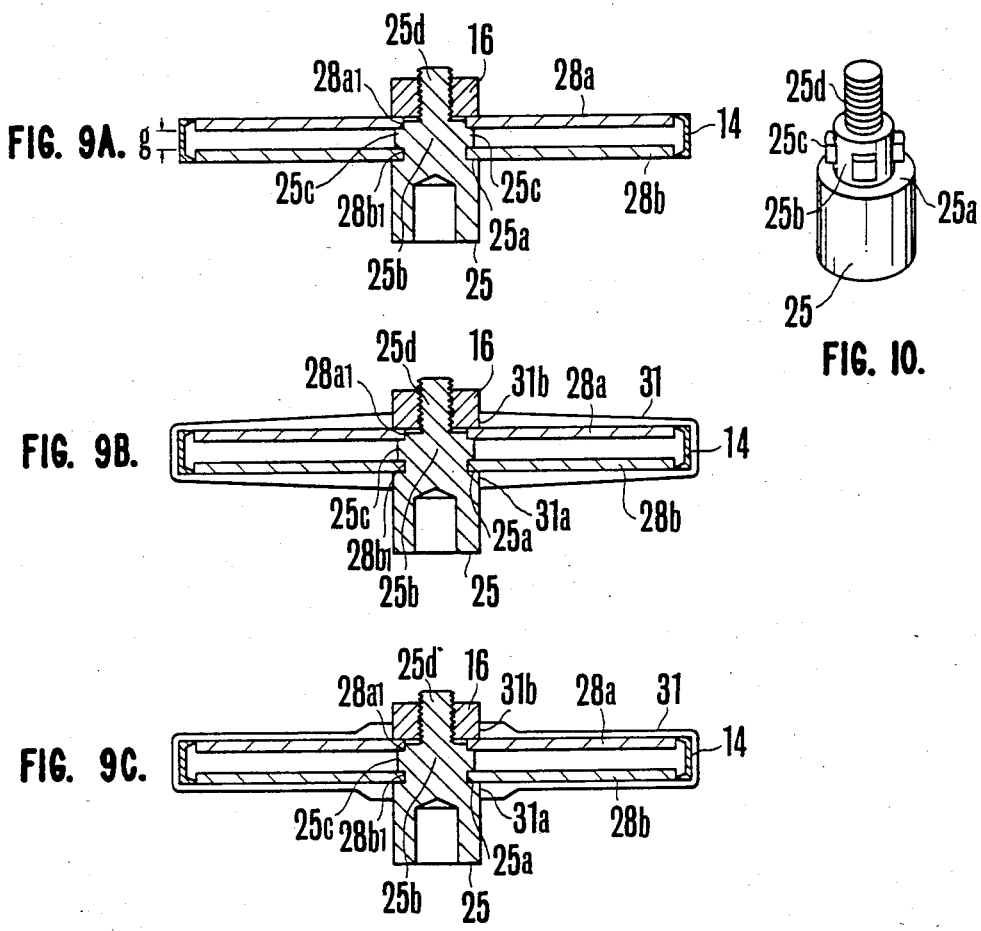

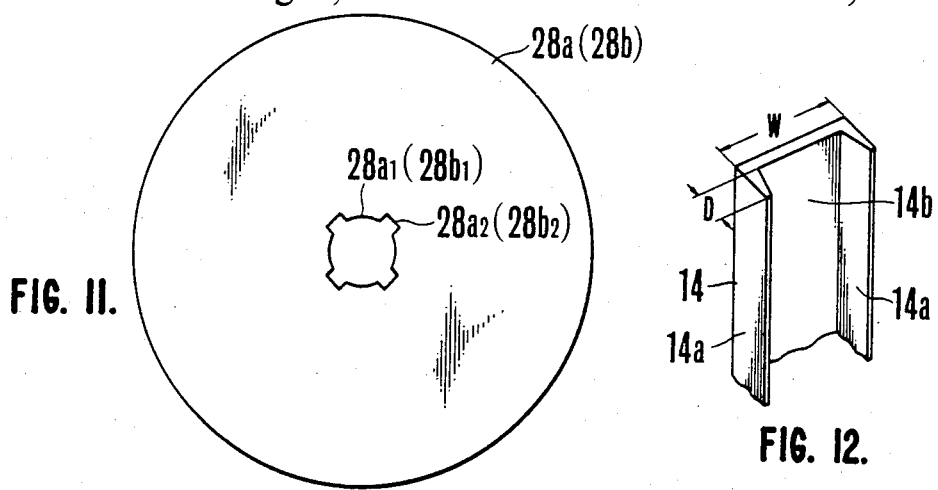
FIG. 11.
FIG. 12.
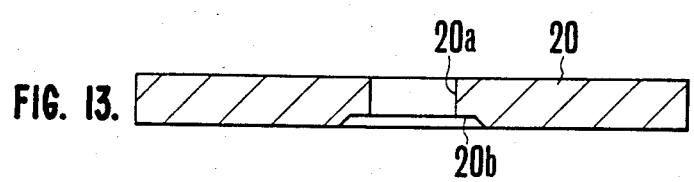
FIG. 13.
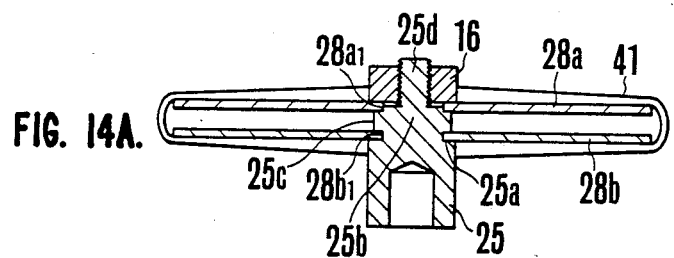
FIG. 14A.
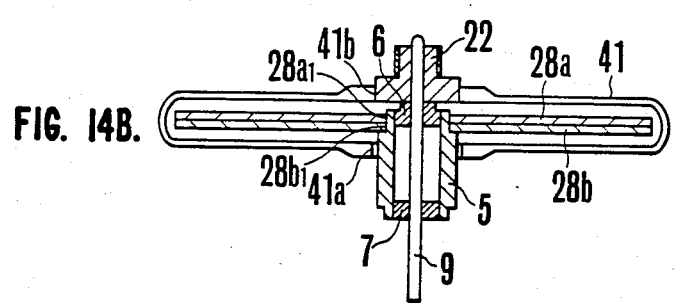
FIG. 14B.

CORELESS MOTOR, AND A METHOD FOR MANUFACTURING THE CORELESS MOTOR

BACKGROUND OF THE INVENTION

This invention relates to a coreless motor which effectively utilizes almost the entire area of the rotor winding for the generation of torque, and the manufacturing method for the coreless motor.

Various coreless motors using air-core rotor windings are already known, but in these coreless motors only some of the area of the rotor winding effectively generates torque, and it is difficult in principle to obtain a high efficiency. Among these coreless motors, the so-called cup-shape coreless motor in which the rotor winding is formed in a cylindrical shape by winding the insulation coated conductor inreverse at the upper and lower edges and winding it obliquely makes it possible to obtain a relatively high efficiency. This type of coreless motor is described in U.S. Pat. No. 3,191,081. In the structure of this coreless motor, however, almost the entire area of the rotor winding crosses the magnetic flux at a right angle; an ineffective portion where the current flowing to the conductor flows in the reverse direction is formed, and the effective portion where the current flow in the same direction will be less than half of the entire area. Moreover, as the conductor is wound obliquely, the effective portion in the vertical direction which generates torque will be further reduced.

Another example is a coreless motor shown in U.S. Pat. No. 2,513,410. The coreless motor is of such structure that a rotor frame consisting of insulated material is designed to be rotated freely so as to enclose a cylindrical permanent magnet at predetermined gaps on the outside of this magnet; the air-core cylindrical rotor winding around which the insulation-coated conductor is entirely wound is formed on this rotor frame; yokes are arranged at gaps on the circumference face of magnet; the circumference face of said rotor winding is arranged to be rotated freely in the magnetic field gap of ring shape between this magnet and yoke.

In this coreless motor, however, the magnetic flux does not act on the upper and lower plane portions of the rotor winding, and these portions become ineffective ones which do not generate torque.

In addition, as the magnet is located inside the rotor winding, the size of the magnet is limited, and therefore it becomes impossible to obtain sufficient motor torque.

SUMMARY OF THE INVENTION

It is an object of this invention to provide a coreless motor of high efficiency which generates torque effectively in almost the entire area of the rotor winding.

In order to attain this object, the present invention use a rotor winding of air-core disc shape which can be rotated freely against the yoke so as to enclose the yoke of disc shape at gaps on the outside of this yoke, and supplies a flux of reverse direction in the direction of the axis to the plane portion on the side opposite to the center of this rotor winding.

Another object of the invention is to provide a manufacturing method for coreless motors which can form the rotor winding of this type of coreless motor by simple means.

To attain this object, according to the present invention, the yoke consists of two sheets of discs; the insulation-coated conductor is wound around the outside of the yoke at predetermined spaces of this disc in the direction of the axis; and a gap is formed between the outside of the yoke and the rotor winding by piling up discs after winding.

Further, to attain said object, the yoke is formed of one disc; a spacer consisting of material which has a greater width than the thickness of the yoke and is soluble in solvents is attached to the flank of the outer circumference of this yoke; and after the rotor winding is formed by winding the insulation-coated conductor around the outside of the spacer, said spacer is dissolved and removed by said solvent.

BRIEF DESCRIPTION OF THE DRAWINGS

In the accompanying drawings:

FIG. 8 is a sectional structural view of another example of the coreless motor according to the present invention;

FIGS. 9A-9C are sectional views of the individual processes for the manufacture of the rotor winding of the coreless motor shown in FIG. 8;

FIG. 10 is a perspective view of the winding shaft jig shown in FIG. 9;

FIG. 11 is a plan view of the yoke shown in FIG. 8 and FIG. 9;

FIG. 12 is a perspective view of some of the ring plate shown in FIG. 8 and FIG. 9;

FIG. 13 is a sectional view of the forming die;

FIGS. 14A-14B are sectional views of the individual processes for the manufacture of the rotor winding of the coreless motor by using the winding shaft jig shown in FIG. 10 and the yoke shown in FIG. 11;

DETAILED DESCRIPTION OF THE PREFERRED EMBODIMENT

Figure 1:
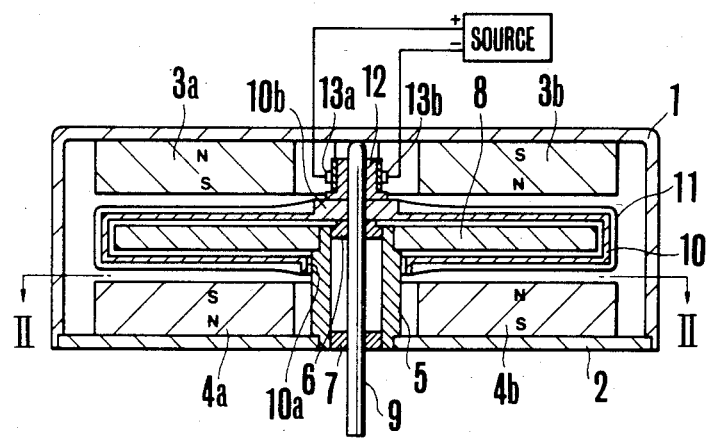
FIG. 1 is a sectional structural view of an example of a coreless motor according to the present invention.
Figure 2:
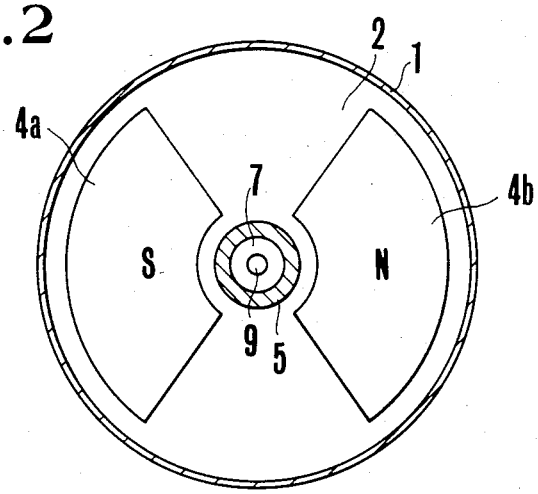
FIG. 2 is a sectional view taken along line II—II.

In FIG. 1 and FIG. 2, 1 is a cap-shape case consisting of magnetic material; 2 is a disc-shape cap case consisting of the same magnetic material; 3a and 3b are permanent magnets fixed in the inner face of case 1, being magnetized longitudinally on the face formed in a sector shape; 4a and 4b are permanent magnets fixed in the inner face of cap case 2, being magnetized longitudinally on the face formed in the sector shape in the same manner as permanent magnets 3a and 3b; 5 is a cylindrical bearing support consisting of non-magnetic material fixed on the center of cap case 2; 6 and 7 are bearings fixed on both openings of bearing support 5; and 8 is a yoke consisting of magnetic material having a center hole, which is formed in a disc shape and fixed in bearing support 5, with the center hole fitting the tip of bearing support 5. This yoke 8 is arranged between magnets 3a and 3b, and 4a and 4b, and the same gaps of magnetic fields are respectively formed between magnets 3a and 3b and yoke 8, magnets 4a and 4b and yoke 8. Here, the magnetic flux in one magnetic field comes out from the N pole of magnet 3b and enters the S pole of magnet 3a through yoke 8, and the magnetic flux in the other magnetic field comes out from the N pole of magnet 4b and enters the S pole of magnet 4a through yoke 8. Accordingly, in both magnetic fields, the magnetic flux flows in the opposite direction with respect to the axis (upper and down directions in FIG. 1) on the opposite side of the center.

On the other hand, 9 is a rotor shaft supported by bearing 6 and 7 so as to rotate freely; 10 is an air-core disc shape rotor frame consisting of a thin plate of synthetic resin along the outside of yoke 8 and arranged to enclose the outside at predetermined gaps with the outside; and 11 is a rotor winding formed by winding the insulation-coated conductor (wire) a round rotor frame 10 (as stated later). With respect to rotor frame 10 center hole 10a is formed in the center of one frame so as to avoid touching bearing support 5, and the center of the other plane becomes support 10b, which is fixed to rotor shaft 9. Accordingly, the plane of rotor winding 11 is supported on the face perpendicular to rotor shaft 9 and is arranged so as to rotate freely in the magnetic field. In addition, 12 is a commutator fixed on rotor shaft 9; 13a is a brush at the positive pole which touches commutator 12; and 12b is a brush at the negative pole.

Figure 3:
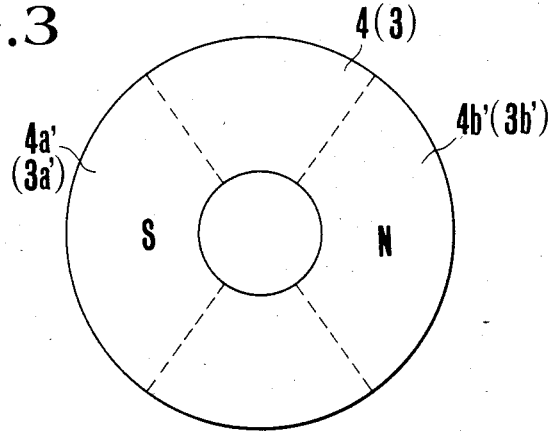
FIG. 3 is a plan view of another example of the permanent magnet.

Brushes 13a and 13b are connected to the source. In addition, with respect to the permanent magnets, ferrite magnets of ring shape may be used as shown in FIG. 3, and the magnets may be magnetized in almost the same shape as magnets 4a and 4b (3a and 3b) and form magnetic poles 4a' and 4b' (3a' and 3b').

Next, the rotor winding is described for the example of five poles.

Figure 4:
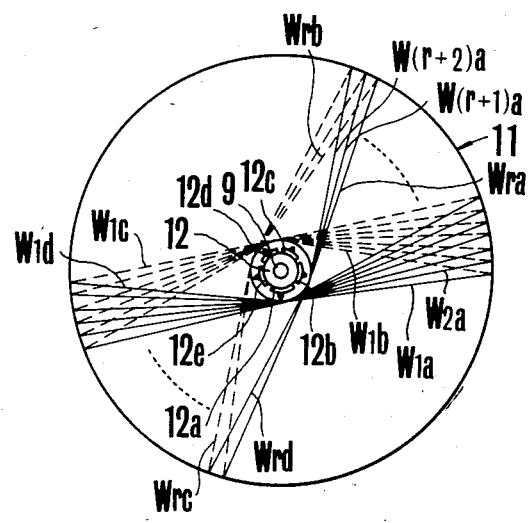
FIG. 4 is a plan view of the rotor winding of the coreless motor shown in FIG. 1.

FIG. 4 is a plan of rotor winding 11. When the starting edge of conductor is connected to commutator segment 12a of commutator 12, the conductor extends from the center on the upper plane of rotor winding 11 outward in the direction of the diameter, is turned down on the side of the circumference through $W_{1a}$, goes to the center from the lower face of rotor winding 11 through $W_{1b}$, passes near the center, further extends to the opposite side, passes $W_{1c}$, is turned up on the side of the circumference at about 180° from said circumference, and goes to the center from the upper plane through $W_{1d}$. Thus, one winding is completed. Further, the conductor passes near the center from $W_{1d}$, goes through $W_{2a}$ at a position which deviates to a minor degree from $W_{1a}$ in the tangential direction, and continues being wound in the same manner as above. If this shifting between $W_{1a}$ and $W_{2a}$, for example, is selected at a value near the diameter of the conductor, rotor winding 11 is formed in almost one layer. In this manner, the conductor is successively wound at progressing angles. When wound at 72°(=360°/5) in the case of five poles, the conductor passes from Wra, Wrb, and Wrc to Wrd and then is connected to the next commutator segment 12b. Then, the conductor continues to be wound successively through W(r+2)a after it has been wound one time from commutator segment 12b through W (r+1)a in the same way as above. Thus, the conductor is successively connected to commutator segments 12c, 12d, and 12e and wound around the circumference, and the edge of the last winding is again connected to commutator segment 12a. Therefore, rotor winding 11 becomes a delta connection. When the total number of windings of the conductor of rotor winding 11 is n, the number of windings r within 72° of adjacent commutator segments becomes n/5.

Next, the operation of this coreless motor is described.

Figure 5A:
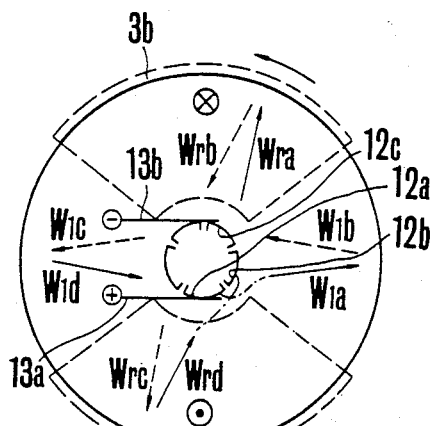
FIGS. 5A-5E are detail views of rotating action of the coreless motor shown in FIG. 1.

FIG. 5A to E are operational diagrams. In the position of FIG. 5A, almost half of $W_{1a}$ to Wra of the conductor opposes magnet 3b, and almost half of $W_{1d}$ to Wrd opposes magnet 3b. In addition, the current which flows from brush 13a to commutator segment 12a reaches commutator segment 12b through the path $W_{1a} \rightarrow W_{1b} \rightarrow W_{1c} W_{1d}$ --- Wra→Wrb→Wrc →Wrd, and further flows from commutator segment 12c to brush 13b, where the magnetic flux of magnet 3b goes from the surface of the paper to its reverse side of the paper to its surface; in $W_{1a}$-Wrd, the current flows in the direction of the center. Therefore, torque is generated counterclockwise in rotor winding 11 in FIG. 5, according to Fleming's lefthand law. This torque permits rotor winding 11 to be rotated counterclockwise.

Figure 5B:
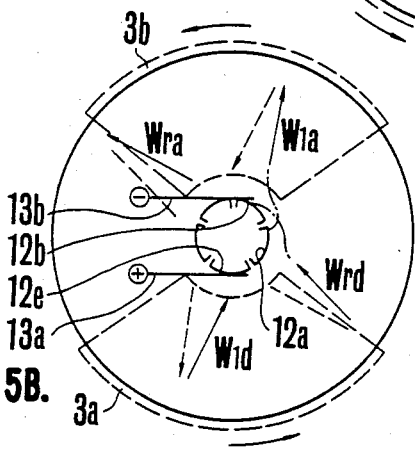

FIG. 5B represents a position to which rotor winding 11 is rotated by 72° from the position of FIG. 5A. At this position, the current passing from brush 13a to commutator segment 12a flows from commutator segment 12b to brush 13b through the path $W_{1a} \rightarrow$----→Wrd. Therefore, torque is successively generated counterclockwise to rotate rotor winding 11.

Figure 5C:
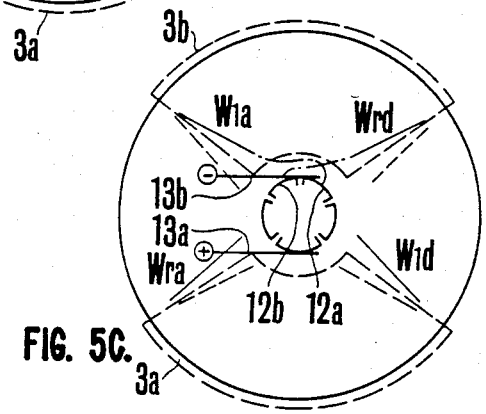

FIG. 5C represents a position to which rotor winding 11 is further rotated by 72° from the position of FIG. 5B. At this position, because commutator segment 12a and 12b are short-circuited by brush 13b, the current does not flow to the conductor connected between them, i.e., between $W_{1a}$ and Wrd. However, as the current is flowing to the other portion of the conductor, rotor winding 11 continues rotating. Further, when rotor winding 11 is rotated from the position of FIG. 5C to a minor degree, commutator segment 12b is parted from brush 13b, and the current flows between the portions of $W_{1a}$ and Wrd in the reverse direction.

Figure 5D:
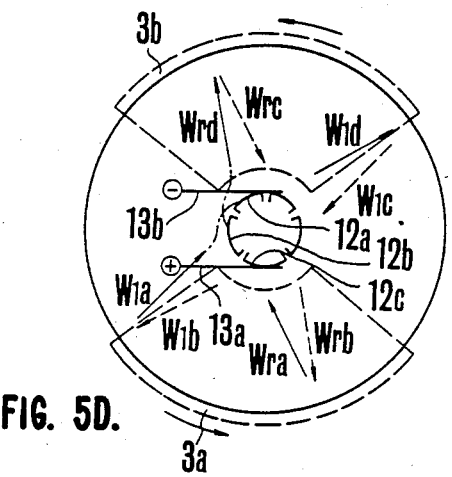

FIG. 5D represents a position to which rotor winding 11 is further rotated by 72° from the position of FIG. 5C. At this position, the current flowing from brush 13a to commutator 12c reaches commutator segment 12a from commutator segment 12b through the path Wrd→Wrc→Wrb→Wra --- $W_{1d} \rightarrow W_{1c} \rightarrow W_{1b} \rightarrow W_{1a}$, from which the current flows to brush 13b. In this condition, the current flowing to the conductor flows in the reverse direction from FIG. 5A and B, but the portion $W_{1a}$ to Wra of the conductor opposes magnet 3a, and the portion $W_{1d}$ to Wrd opposes magnet 3b. The fluxes of the magnets opposing each portion are in opposite directions and successively generate torque counter clockwise.

Figure 5E:
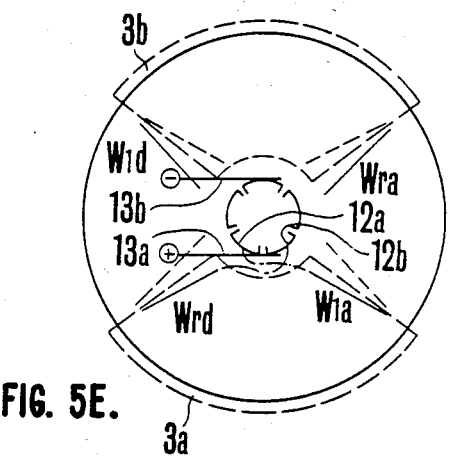

FIG. 5E represents a position to which rotor winding 11 is rotated by 108° from FIG. 5D. At this position, as commutator segments 12a and 12b are short-circuited by brush 13a, the current does not flow briefly between $W_{1a}$ and Wrd in the same way as at the position of FIG. 5C. Further, from this position, the current again flows outward at the positions from $W_{1a}$ to Wra along the conductor, and the current flows in the direction of the center at the portion from $W_{1d}$ to Wrd. When rotated by 36° from the position of FIG. 5E, rotor winding 11 takes the position of FIG. 5A and completes one rotation.

The above description relates to only the conductor connected between commutator segments 12a and 12b; quite the same operation occurs for the conductor between other commutator segments. Further, a description of torque generation at the portion of the conductor on one (upper) plane of rotor winding 11 has been given, but torque generation for the conductor on the other (lower) plane is done by the other magnets (4a and 4b) in the same manner as above.

Further, in FIG. 5 the angle between magnets 3a and 3b is almost equal to the angle 72° of one pole of rotor winding 11. Accordingly, the center angle formed by sector shaped magnets 3a and 3b, and 4a and 4b, becomes almost 108°. This is because if said angle between the magnets is smaller than that of one pole of the rotor winding, one pole of the rotor winding extends over both magnets, whose flux directions are different from one another, and the magnets generate torque in the reverse directions respectively to partially cancel the effective torque, and thus reduce the net torque. Accordingly, if the number of poles of the rotor winding increases, the angle of one pole of the rotor winding decreases, and the angle between the magnets decreases to increase the center angle formed by the magnets. Thus, the range of torque generation is expanded to raise the efficiency of the motor. For example, when the rotor winding is seven poles or nine poles, the angle equal to one pole becomes 51.4°, or 40°.

Thus, the present invention provides a coreless motor in which the rotor winding is formed in the air-core disc shape, ineffective portions are only part of the center and the side of the outer circumference, and both planes become effective portions which generate torque over the entire planes. In addition, the conductor arranged in a radial manner has only a minor inclination in the direction of the diameter; the effective portion is at a right angle to the circumference, so rotation is obtained to a great extent. Accordingly, the efficiency of the motor is drastically improved.

In the example described above, the rotor winding is formed by winding the conductor around the rotor frame, but the conductor alone can form the rotor winding.

Figure 6:
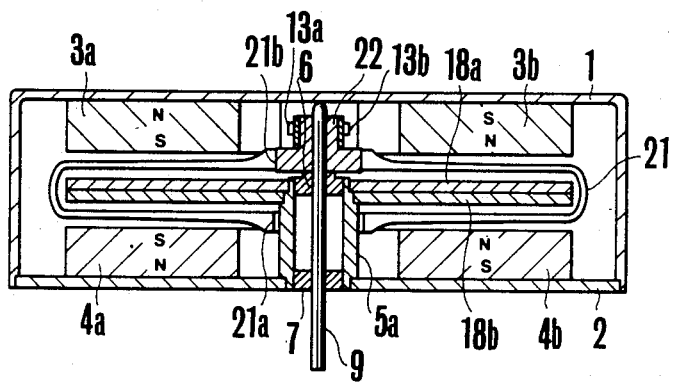
FIG. 6 is a sectional structural view of another example of the coreless motor according to the present invention.

FIG. 6 is a sectional structural view of an example of a coreless motor in which the rotor winding is formed by conductor only, and elements corresponding to those in FIG. 1 are given the same reference numerals. 18a and 18b are yoke discs having center holes and consisting of magnetic material formed in a disc shape; one yoke is constituted by superimposing two yoke discs. 21 is a rotor winding where the conductor is wound in the same way as in FIG. 4.

Next, the manufacturing method for this type of rotor winding 21 is described below by using FIG. 7A to D.

Figure 7A:
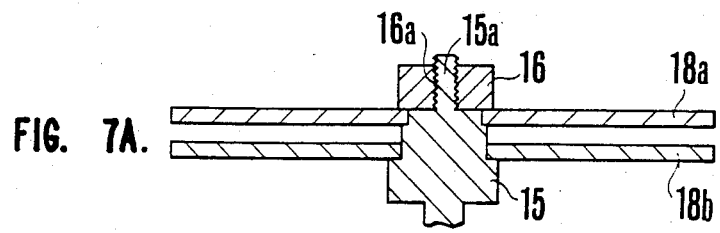
FIGS. 7A through 7D are sectional views of the individual processes for the manufacture of the rotor winding of the coreless motor shown in FIG. 6.
Figure 7B:
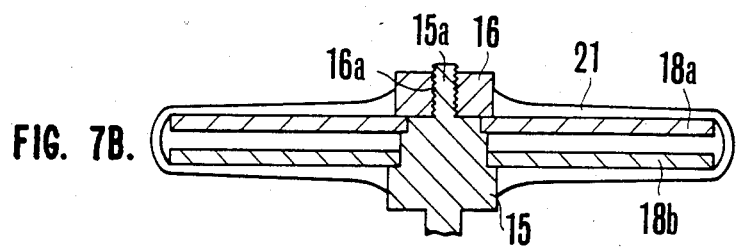
Figure 15:
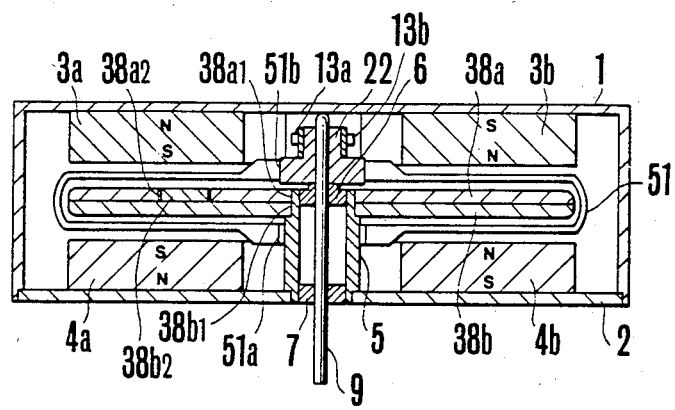
FIG. 15 is a sectional structural view of another example of the coreless motor according to the present invention.

In FIG. 7A, 15 is a winding shaft jig of cylindrical shape having two stage portions whose diameters are different from one another and form screw portion 15a at the tip; 16 is a cylindrical hold jig which forms a tapped hole at the center. The center hole of the yoke disc 18b is fit and set into the stage portion with a larger diameter, and the center hole of the yoke disc 18a is fit and set into the stage portion with a smaller diameter. Then, tapped hole 16a is spirally fit into the screw portion, and hold jig 16 is mounted on winding shaft jig 15. At that time, yoke discs 18a and 18b are mounted on winding shaft jig 15 and hold jig 16 respectively at predetermined gaps in the direction of the axis. This becomes a winding core for winding the conductor. FIG. 7B shows the state of rotor winding 21 which is formed by winding the insulation-coated conductor as shown in FIG. 4. This conductor consists of so-called cement wire which is insulation-coated and further coated with material which is dissolved by solvents and heat on the film of insulation. This conductor is wound on the outsides of yoke discs 18a and 18b entirely and directly through the outer circumferential faces of winding shaft jig 15 and hold jig 16 at the center. At that time, the conductor curves greatly at the edges of outer circumferences of yoke discs 18a and 18b, and the flank of the outer circumferences of the rotor winding projects in the shape of a curved surface.

In addition, at that time, it is possible to greatly project the flank of the outer circumference intentionally with a pin acting in synchronization with the rotation of the winding machine, etc. After winding, rotor winding 21 is formed by being pressed with a forming die of ring shape through the permeation of solvent into, or heating, rotor winding 21. This makes it possible to make the plane of rotor winding 21 flat. If the surface of the forming die is coated with an exfoliating agent, it does not touch rotor winding 21, and if the amount of solvent is controlled so as not to penetrate into the surfaces of yokes 18a and 18b, rotor winding 21 does not touch yoke discs 18a and 18b.

Figure 7C:
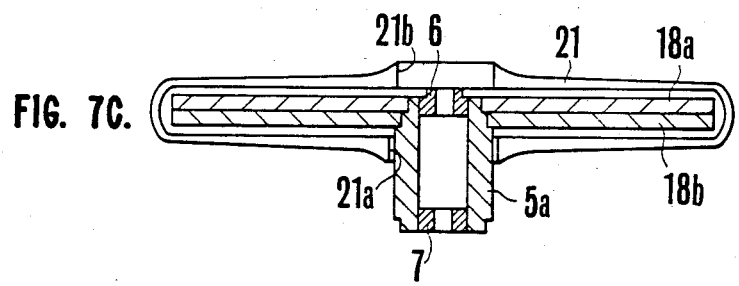

FIG. 7C shows hold jig 16 turned and removed from winding shaft jig 15, where winding shaft jig 15 is removed from the center holes of yoke discs 18a and 18b, and yoke discs 18a and 18b are piled up and mounted on bearing support 5a.

Center hole 21a is formed by winding shaft jig 15 at the center of the plane of rotor winding 21 on one side, and center hole 21b is formed by hold jig 16 at the center of the plane on the other side. The inside diameter of this center hole 21a is formed somewhat larger than the outside diameter of bearing support 5a. On the face of the outer circumference of bearing support 5a are formed two-stage portions. These stage portions are respectively forced into the center holes of yoke discs 18a and 18b. Thus, the unification is done by superimposing yoke discs 18a and 18b. Thereby, predetermined gaps are formed on both the plane and the flank of the outer circumference between the outside of yoke discs 18a and 18b and the inside of rotor winding 21.

Figure 7D:
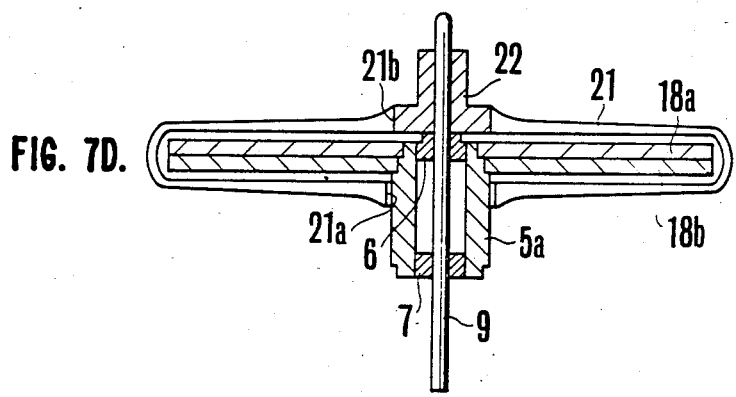

FIG. 7D shows the completion of the rotor where rotor shaft 9 and commutator 22 are connected to rotor winding 21 shown in FIG. 7C. Rotor shaft 9 on which commutator 22 is fixed is inserted into bearing 6 and 7. At that time, commutator 22 is simultaneously inserted into center hole 21b, and rotor winding 21 is fixed on this commutator 22. In addition, at the time of winding of rotor winding 21 (which is not illustrated), an intermediate tap equal to the number of poles is drawn out, and this tap is connected to the commutator segment of commutator 22. Bearing support 5a is fixed on cap case 2.

As stated above, because the coreless motor using the rotor winding without a rotor frame makes it possible to make a smaller gap between the magnet and the yoke, the density of the magnetic flux of the magnetic field increases to intensify the torque, and if the density of the magnetic flux is the same, it is possible to make the magnet smaller accordingly. With respect to the rotor, as the parts of a rotor frame are not required, weight of rotor winding is possible to decrease and manufacturing cost can be reduced.

FIG. 8 is a sectional structural view of the coreless motor of another example. 28a and 28b are yoke discs each having a center hole of the same size and consisting of a magnetic material formed in a disc shape, and 31 is a rotor winding in which the inside of the outer circumferential face is provided with a ring plate 14. The other parts are the same as those for the coreless motor shown in FIG. 1. In addition, this ring plate 14 may be used for the coreless motor shown in FIG. 6. Rotor winding 31 of this coreless motor is formed by the process shown in FIG. 9A to C. In FIG. 9A to C, 25 is a cylindrical winding shaft jig which, as shown in FIG. 10, has a core 25b formed into a somewhat small diameter by stage 25a, four projections 25c each having a predetermined axial height formed at intervals of 90° on the face of the outer circumference, and a screw 25 formed at the tip of core 25b. Yoke disc 28a, (28b) of the same shape, as shown in FIG. 11, forms a center hole $28_1$ ($28b_1$) center, and center hole $28a_1$ ($28b_1$) forms four concavities $28a_2$ ($28b_2$) to permit the entry of projection 25c at intervals of 90°.

First, center hole $28b_1$ of yoke disc 28b is fit to the positions of concavity $28b_2$ and projection 25c, and fixed into core 25b. Yoke disc 28b is lowered until it touches stage 25a, then turned by about 45°, and mounted on winding shaft jig 25. Thereby yoke disc 28b will not come out upwards. Next, center hole $28a_1$ of yoke disc 28a is fixed into core 25b so that concavity $28a_2$ cannot fit projection 25c, and yoke disc 28a is mounted on winding shaft jig 25 by screwing hold jig 16 into screw 25d. When the predetermined gap between yoke 28a, 28b and rotor winding 31 is designated as d, and the gap of two yoke discs 28a and 28b, i.e., height of projection 25c is designated as g, the equation g=2d is obtained. In addition, yoke disc 28a may be of such a shape that it does not form concavity $28a_2$ but forms only center hole $28a_1$.

Then, as shown in FIG. 12, a long ring plate 14 consisting of insulated material on which walls 14a are formed on both sides, and a groove 14b is formed between both walls 14a, is circumferentially mounted with groove 14b turned inward so that the tips of walls 14 can touch the flanks of outer circumferences of yoke discs 28a, 28b. Accordingly, the inside diameter formed by the tips of walls 14a of ring plate 14 becomes almost equal to the outside diameters of yoke discs 28a, 28b. FIG. 9A shows this condition. When the width of ring plate 14 is designated as W, the depth of groove 14b as D, and the thickness of yoke disc 28a, 28b as T, the dimensions are as given below.

$$W = 2T + 2d$$

$$D \approx d$$

Next, winding shaft jig 25 is chucked to the winding machine, the conductor of cement wire is wound in the same way as shown in FIG. 4, and rotor winding 31 is formed. Rotor winding 31 has a smaller plane area at the center than at the circumference, and the thickness increases as the winding approaches the center. In addition, center holes 31a and 31b are respectively formed by the faces of circumferences of winding shaft jig 25 and hole jig 16. FIG. 9B shows this condition.

Next, the forming of the rotor winding is made by using forming die 20 as shown in FIG. 13. This forming die 20 has a center hole 20a and a concavity 20b, and the forming is done by fixing this center hole 20a into hold jig 16 and then into winding shaft jig 25, and by holding and pressing the plane portion of rotor winding 31 between forming die 20 and yoke discs 28a, 28b, so that the plane portion is made flat. The center portion of the rotor winding is thickly formed by concavity 20b. When the conductor is formed by heating or applying solvents, conductors adhere to each other, and the layer of conductor is formed in a plate. FIG. 9C shows this condition.

Next, hold jig 16 is removed, and projection 25C is removed from yoke discs 28a and 28b through concavity $28b_2$ by turning winding shaft jig 25 by about 45°. Then, when bearing support 5 is forced into yoke discs 28a and 28b, and commutator 12 is inserted into center hole 31b and cemented in place, the rotor having the structure shown in FIG. 8 is formed.

FIG. 14 shows a sectional view of each process for the rotor winding of another example. The elements corresponding to those in FIG. 9 are given the same reference numerals. After yoke disc 28b is mounted on winding shaft jig 25, yoke disc 28a is mounted by screwing the hold jig 16 onto winding shaft jig 25. Then, the conductor is wound around the outsides of yoke discs 28a, 28b in the same way as in FIG. 4. In this case, there is no ring plate 14, but the conductor turns greatly at the edge of the outer circumferences of yoke discs 28a, 28b at the time of winding, and the flank of the outer circumference of rotor winding 41 projects in the shape of a curved surface. FIG. 14A shows this condition. Further it is possible to pull the conductor outward at the face of the outer circumference by using a hook pin, etc. at the time of winding and make a projection forcibly.

After winding, the forming of rotor winding 41 is done in the same way as above. Then, hold jig 16 is removed, and, further, winding shaft jig 25 is removed from yoke discs 28a, 28b. Then, bearing support 5 is forced and fixed into center holes $28a_1$, $28b_1$ of yoke discs 28a, 28b, and commutator 22 is inserted into and cemented to center hole 41b of rotor winding 41. FIG. 14B shows this condition.

Figure 16A:
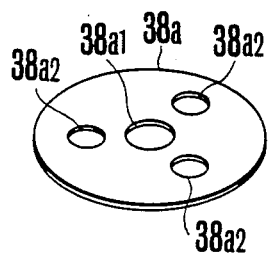
FIGS. 16A-16B are perspective views of the yoke of the coreless motor shown in FIG. 15.

FIG. 15 shows a sectional structural view of another example. According to FIG. 15, 38a is a yoke disc consisting of magnetic material which has a center hole $38a_1$ and three holes $38a_2$ at intervals of 120°, as shown in FIG. 16A; 38b is a yoke disc consisting of a magnetic material having a center hole $38b_1$ of the same size as the center hole $38a_1$ and three projections $38b_2$ at intervals of 120° so as to be put into hole $38a_2$; and 51 is a rotor winding. Yoke discs 38a and 38b are superimposed by putting projections $38b_2$ into holes $38a_2$, and form a yoke. Accordingly, the height of projection $38b_2$ is formed to be the same as the thickness of yoke disc 38a, or lower than the latter.

Figure 17A:
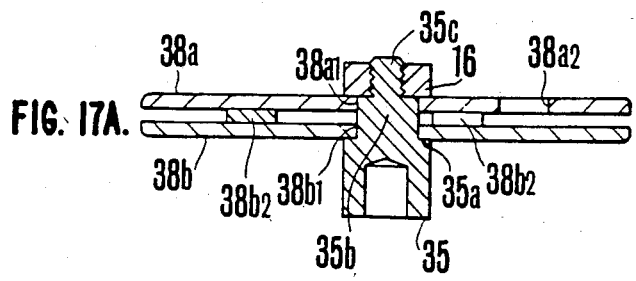
FIGS. 17A-17C are sectional views in the individual processes for the manufacture of the rotor winding of the coreless motor shown in FIG. 15.
Figure 17B:
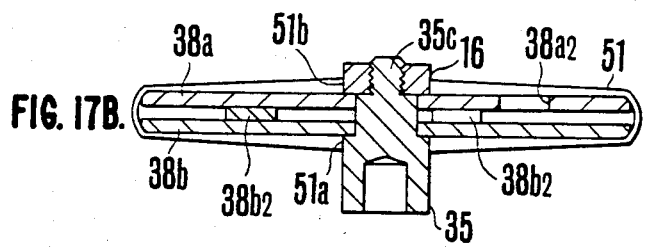
Figure 17C:
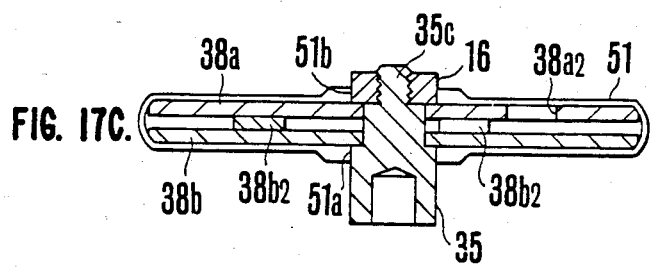

FIGS. 17A to 17C are sectional views of each for the manufacture of rotor winding 51. In FIG. 17A, cylindrical winding shaft jig 35 consists of a core whose diameter is made somewhat small by stage 35a, and screw 35c formed at the tip of core 35b. Yoke discs 38b, 38a are successively attached by fixing center holes 38b$_1$, 38b$_2$ into the core of 35b of this winding shaft jig 35. At that time, when projection 38b$_2$ is displaced in the tangential direction so as not to fit hole 38a$_2$, projection 38b$_2$ lies between yoke discs 38a and 38b, and a space equal to the height is formed. Then, hold jig 16 is screwed into screw 35c to fix yoke discs 38a, 38b into winding shaft jig 35.

In FIG. 17B, the winding shaft jig is chucked to wind cement wire conductor around the outsides of yoke discs 38a, 38b and to form rotor winding 51, as shown in FIG. 4.

Because the outside of the end of the outer circumference of yoke discs 38a, 38b is made to have an inclined face by cutting the edge, it becomes easy to project the slant of the outer circumference of rotor winding 51 on the curved surface. In addition, when yoke discs 38a, 38b are superimposed after rotor winding 51 is formed by said inclined face, the gap of the flank of the outer circumference can sufficiently be obtained. 51a and 51b are the center holes 51 formed by the face of the outer circumference of hold jig 16.

After winding, the forming is done by using the forming die in the same manner as above, to cement the conductors. FIG. 17C shows this condition. After the rotor winding is hardened, hold jig 16 is removed, and then winding shaft jig 35 is drawn out from center holes 38a$_1$ and 38b$_1$. Then, yoke discs 38a and 38b are turned alternately to fit the positions; projection 38b$_2$ is put into hole 38a$_2$; and both are superimposed to make a sheet of yoke. Then, when bearing support 5 is forced into center holes 3a$_1$ and 38b$_1$, the structure shown in FIG. 15 is formed.

The distance between two yoke discs at the time of winding is determined by the height of the projection 38b$_2$. Because the height of the projection cannot be higher than the thickness of the yoke disc, the gap cannot be made greater than to a certain degree in the examples mentioned above.

Next, the following is the description of an example in which the above is improved.

Figure 18:
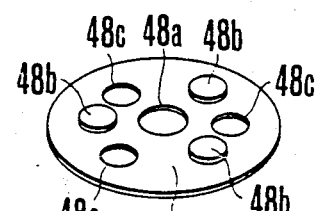
FIG. 18 is a perspective view of another example of the yoke shown in FIG. 16A and B.
Figure 19:
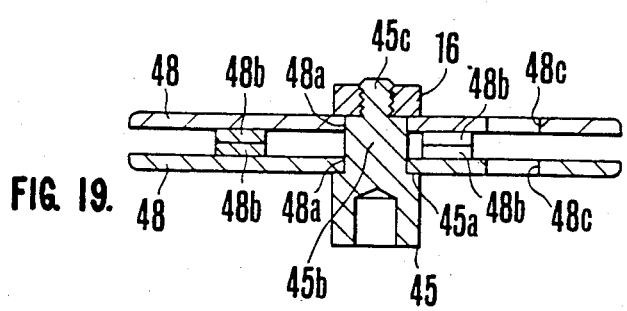
FIG. 19 is a sectional view of one process for the manufacture of the rotor winding by using the yoke shown in FIG. 18.

FIG. 18 is a perspective view of the yoke disc of this example. Yoke disc 48 is provided with a center hole 48a at the center, three projections 48b at intervals of 120° on one side, and three holes 48C at intervals of 120° between projections 48b. This yoke disc 48 which is attached to winding shaft jig 45 by opposing two discs so that the surfaces of projections 48b can touch each other is fixed by hold jig 16. Then, when the rotor winding is formed by winding the conductor in the same manner as in FIG. 17B and C, the opposing space of the plane portion of this rotor winding becomes greater by the height of projection 48b than in the example shown in FIG. 17. Accordingly, two yoke discs 48 are superimposed after winding and forming so that projections 48b can alternately be put into holes 48c of the other yoke disc to form one yoke, and then, when the motor is assembled, the gap between the plane of the rotor winding and the yoke is doubled as compared with the example shown in FIG. 15.

Figure 16B:
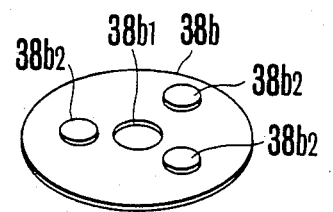

In addition, the plane-cylindrical projection is attached to the yoke disc in the examples shown above, but the projection can be formed by cutting some of the yoke disc or semi-drawing processing. In addition, the holes and projections shown in FIG. 16 and FIG. 18 may be formed in various shapes other than in the disc shape.

Figure 20:
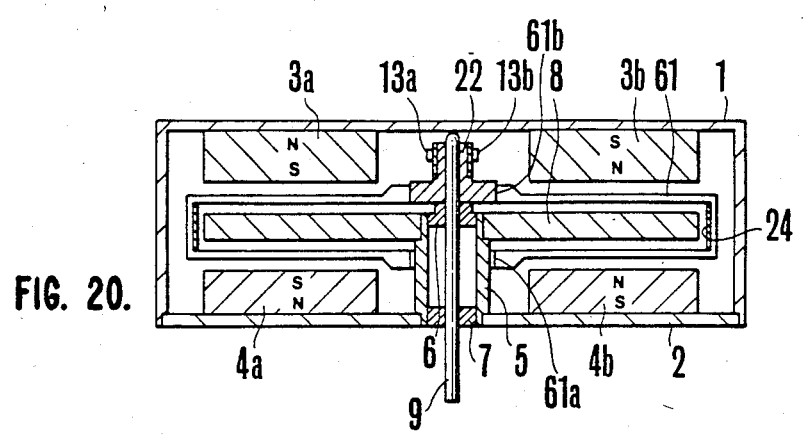
FIG. 20 is a sectional structural view of another example of the coreless motor according to the present invention.

FIG. 20 is a sectional structural view of another example. In FIG. 20, the same parts as in FIG. 1 are given the same numbers. Rotor winding 61 consists of a conductor only without using a rotor frame. 24 is a thin plate provided in the inside of the flank of the outer circumference of the rotor winding.

Figure 21A:
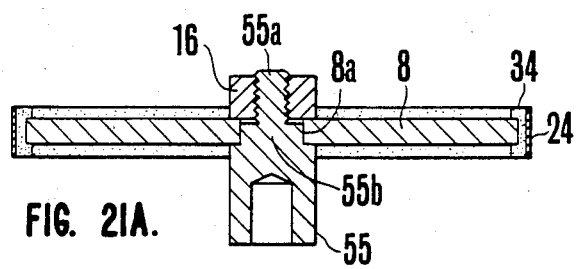
FIGS. 21A-21B are sectional views of the individual processes for the manufacture of the rotor winding of the coreless motor shown in FIG. 20.
Figure 22:
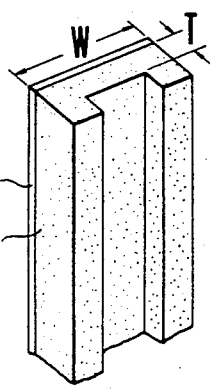
FIG. 22 is a perspective view of some of the spacer shown in FIG. 21.

FIG. 21A and B are sectional views of each process for the manufacture of rotor winding 61. In FIG. 21A, 55 is a cylindrical winding shaft jig having a screw 55a at the center and forming a concentric core 55b whose diameter is somewhat small; 34 is a long spacer consisting of styrofoam and having a groove; and 24 is a thin plate consisting of insulated material and adhering to the bottom of spacer 34. Spacer 34, as shown in FIG. 22, has a groove which is fixed into the outer circumference of yoke 8, and the entire width W and the thickness of the bottom T are formed in such dimensions that a predetermined gap can be maintained between rotor winding 61 and yoke 8 after winding. Spacer 34 is fixed along the entire circumference of yoke 8. After center hole 8a of yoke 8 is attached to spacer 34 in this manner, hold jig 16 is screwed into screw 55a and held, and fixed to winding shaft jig 55.

Then, winding shaft jig 55 is chucked to the winding machine, and the cement wire conductor is wound in the radial direction so as to cover the outsides of spacer 34 and thin plate 24 through the faces of the outer circumference of winding shaft jig 55 and hold jig 16, and, further, the spacer on the upper and lower sides of yoke 8; and the conductor is wound around the entire circumference, successively being shifted in the tangential direction in the same way as in FIG. 4. That is, the conductor is wound by spacer 34 at predetermined gaps with yoke 8.

Figure 21B:
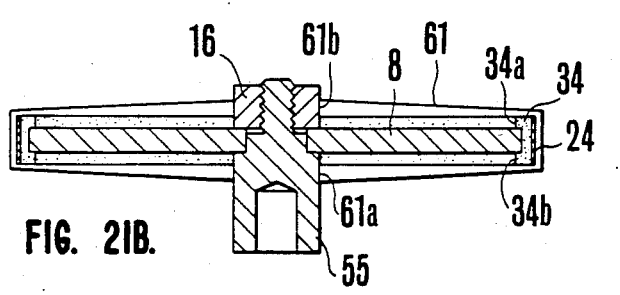

FIG. 21B shows the condition of the completion of the winding. Wound rotor winding 61 is formed, in the condition in which it is heated or wetted by alcohol, by the forming die shown in FIG. 13. When the die is fixed into hold jig 16 and pressed on yoke 8, concavity 34a of spacer 34 which lies in the direction of the axis between yoke 8 and rotor winding 61 is destroyed, and the plane portion of rotor winding 61 is formed flat as conductors alternatly adhere to each other. When the forming die is fixed into winding shaft jig 55 and pressed on yoke 8, concavity 34b of spacer 34 is destroyed, and the plane portion of rotor winding 61 is formed flat.

Then, hold jig 16 is removed, and winding shaft jig 55 is taken off yoke 8. Because center holes 61b and 61a are respectively formed by hold jig 16 and winding shaft jig 55 at the centers of both plane portions of rotor winding 61, trichloroethylene is flowed into center holes 61b and 61a of rotor winding 61 to dissolve spacer 34 (of styrofoam) and to remove it. However, thin plate 24 is still left. In this manner, rotor winding 61 is manufactured. Further, rotor winding 61 may be manufactured by spacer 34 only without using thin plate 24. In addition to styrofoam, various materials which are dissolved by solvent may be used for the spacer.

Thus, according to the coreless motor of the present invention, a wider area of effective portion which generates torque can be obtained, and the efficiency of the motor is remarkably improved. In addition, a rotor winding of air-core disc shape can be manufactured by a simple process using the conductor only without using rotor frames. Thus, the rotor winding, the plane portion of which is formed by conductor only, makes it possible to make the gap between the magnet and the yoke smaller and further raise the efficiency of the motor.

What is claimed is:

1. A coreless motor which comprises:
    an air-core disc shaped rotor winding comprising a plurality of conductive loops formed from an insulation coated conductor, each said loop extending in the radial direction from a point on the circumference of said winding through the vicinity of the center of said winding to a substantially diametrically opposed point on said circumference, downward along the edge of said circumference to the lower face of said winding, along the radial direction on the lower face of said winding from a point on the circumference thereof, through the vicinity of said center to a substantially diametrically opposed point on said circumference, upward along the edge of said circumference to the upper face of said winding, each said loop being displaced from the preceding loop in the tangential direction of said winding;
    a disc shaped yoke formed of magnetic material housed in said rotor winding with a gap therebetween; and
    a permanent magnet disposed in a position opposing the plane portion of said rotor winding and having a magnetic pole means for providing magnetic flux which is alternately reversed in the direction of the axis of said winding in regions of said winding lying on opposite sides of the center of said plane portion,
    said yoke and said permanent magnet means being fixed relative to each other, and said rotor winding being freely rotatable with respect to said yoke and said permanent magnet means.

2. A coreless motor according to claim 1 wherein two yoke discs are superimposed on one another.

3. A coreless motor according to claim 2 wherein one of the said yoke discs includes a center hole having multiple concavities along the outer circumference thereof, and the other of the said yoke discs includes a hole of the same shape as said center hole.

4. A coreless motor according to claim 2 or 3 further including a ring plate located in the inside of the flank of the outer circumference of said rotor winding, said plate forming a groove opening inwardly in the direction of the periphery of said yoke discs.

5. A coreless motor according to claim 2 wherein one of said yoke discs includes multiple holes positioned at intervals in the tangential direction, and the other of said yoke discs includes multiple projections whose shapes fit said holes at the positions corresponding to said holes.

6. A coreless motor according to claim 2 wherein one of said yoke discs includes multiple holes at intervals in the tangential direction and multiple projections on one face, and the other of said yoke discs includes multiple holes at the positions corresponding to said projections having shapes conformable with said projections for receiving same said other yoke disc including multiple projections located at positions corresponding to said holes in said one yoke disc and having shapes conformable therewith.

7. A coreless motor according to claim 1, 2, 3, 5, or 6 wherein two sets of said permanent magnets are respectively placed so as to oppose both plane portions of said rotor winding.

8. A coreless motor corresponding to claim 1, 2, 3, 5, or 6 further including a bearing support for rotatably supporting said rotor winding, and wherein said yoke is secured by the bearing support.

* * * * *